(12) United States Patent
Ghosh (10) Patent No.: US 8,483,329 B2
(45) Date of Patent: Jul. 9, 2013

(54) ROBUST SENSING FOR DETECTING SIGNALS USING CORRELATION

(75) Inventor: Monisha Ghosh, Chappaqua, NY (US)

(73) Assignee: Koninklijke Philips N.V., Eindhoven (NL)

( * ) Notice: Subject to any disclaimer, the term of this patent is extended or adjusted under 35 U.S.C. 154(b) by 733 days.

(21) Appl. No.: 12/529,409

(22) PCT Filed: Mar. 6, 2008

(86) PCT No.: PCT/IB2008/050823
§ 371 (c)(1),
(2), (4) Date: Sep. 1, 2009

(87) PCT Pub. No.: WO2008/107854
PCT Pub. Date: Sep. 12, 2008

(65) Prior Publication Data
US 2010/0035568 A1 Feb. 11, 2010

Related U.S. Application Data

(60) Provisional application No. 60/893,208, filed on Mar. 6, 2007.

(51) Int. Cl.
*H04L 27/06* (2006.01)

(52) U.S. Cl.
USPC ........... 375/343; 375/270; 375/316; 375/320; 375/321; 375/322

(58) Field of Classification Search
USPC ................. 375/130, 142, 143, 150, 152, 229, 375/271, 277, 295, 316, 321, 343
See application file for complete search history.

(56) References Cited

U.S. PATENT DOCUMENTS

| | | | | |
|---|---|---|---|---|
| 6,661,855 B2 * | 12/2003 | Kim | ............................. | 375/343 |
| 6,803,966 B2 * | 10/2004 | Hong | ............................ | 348/500 |
| 7,130,332 B1 * | 10/2006 | Shenoi | ........................... | 375/150 |
| 7,480,009 B2 * | 1/2009 | Cheon et al. | ................... | 348/521 |
| 7,570,717 B2 * | 8/2009 | Kim et al. | ..................... | 375/326 |
| 7,929,628 B2 * | 4/2011 | Kawauchi et al. | ............ | 375/260 |
| 2003/0118081 A1 * | 6/2003 | Philips et al. | ................. | 375/130 |
| 2004/0001539 A1 * | 1/2004 | Sankaran et al. | ............. | 375/231 |
| 2004/0114675 A1 * | 6/2004 | Crawford | ...................... | 375/149 |
| 2006/0077300 A1 * | 4/2006 | Cheon et al. | .................. | 348/614 |
| 2006/0209927 A1 * | 9/2006 | Khandekar et al. | ........... | 375/146 |

(Continued)

OTHER PUBLICATIONS

Linjun LV et al., "Sensing Scheme for DVB-T", IEEE Standard Proposal, 802.22, (Nov. 10, 2006), pp. 1-11.*

(Continued)

*Primary Examiner* — Hirdelpal Singh
(74) *Attorney, Agent, or Firm* — Larry Liberchuk (57) ABSTRACT

To quickly and robustly detect the presence of an incumbent user and rapidly relinquish the spectrum to the incumbent user when necessary, carrier recovery is performed in a receiver of the secondary user's cognitive or software radio prior to performing correlation detection with an upsampled reference signal to correct for large frequency offsets and improve the performance of the correlation detector. To detect a received signal, a pilot value is added to a reference signal. The reference signal is upsampled to a sampling frequency of the received signal. The upsampled reference signal is correlated with a demodulated baseband signal to produce a correlation value. It is then determined whether the received signal is present if the correlation value is greater than a predetermined detection threshold value.

13 Claims, 5 Drawing Sheets

U.S. PATENT DOCUMENTS

2006/0291578 A1* 12/2006 Singh et al. .................. 375/260
2007/0253319 A1* 11/2007 Jansen ......................... 370/208
2008/0075201 A1* 3/2008 Limberg ....................... 375/321

OTHER PUBLICATIONS

Monisha Ghosh et al, "DTV Signal Sensing Using Pilot Detection", IEEE Standard Proposal, 802.22, Mar. 11, 2007, pp. 1-22, XP002490052, Retrieved from the Internet: URL :https://mentor.ieee.org/802.22/fi l e/07/22/07/0125-00-OOOO-philips-pilot-detection-based-sensing.ppt>.

Xianbin Wang et al: "Robust Data Transmission Using the Transmitter Identification Sequences in ATSC DTV Signals", Consumer Electronics, 2005. ICCE., Digest of Technical Papers. Conference on Las Vegas, NV, 8-12, 2005, Piscataway, NJ, USA,IEEE, Jan. 8, 2005, pp. 421-422, XP010796711.

Linjun LV et al., "Sensing Scheme for DVB-T", IEEE Standard Proposal, 802.22, Nov. 10, 2006, pp. 1-11, XP002490053, Retrieved from the Internet: URL :https://mentor.ieee.org/802.22/fi l e/06/22/06/0263-00-OOOO-huawei-sensing-schemefor-dvb-tdoc>.

* cited by examiner

ROBUST SENSING FOR DETECTING SIGNALS USING CORRELATION

This application claims the benefit of the U.S. provisional application Ser. No. 60/893,208, filed on Mar. 6, 2007.

The present invention relates to communication systems that include cognitive radios and/or software defined radios (SDRs) to achieve efficient and reliable spectrum use without harmful interference to incumbent services such as television (TV) receivers A number of proposals have been made to allow the use of TV spectrum by unlicensed devices, provided that the unlicensed users do not create harmful interference to the incumbent users of the spectrum. It is envisioned that these unlicensed devices will possess the capability to autonomously identify channels within licensed television bands where they may transmit without creating harmful interference.

An Institute of Electrical and Electronics Engineers (IEEE) 802.22 Wireless Regional Area Network (WRAN) Working Group is preparing a standard with respect to a physical (PHY) and Media Access Control (MAC) layer interface. The interface enables a non-allowed system to utilize a spectrum, which is assigned to a television (TV) broadcasting service, based on cognitive radio (CR) technology. To coexist with an incumbent system and avoid an interference, which may affect existing services such as a TV broadcast, a wireless microphone, and the like, a MAC protocol of IEEE 802.22 enables a CR base station to dynamically change a channel currently in use, or a power of a CR terminal when a usage of a spectrum, used by the incumbent system, is detected.

To avoid interference with an incumbent system, a CR terminal uses correlation-based sensing methods that assume minimal frequency offset in the received signal. However, measurements indicate that large frequency offsets of +/−20 kHz are not uncommon. These large offsets may be intentional or unintentional. Some possible intentional sources of frequency offsets may include the transmitter, which may correct for adjacent interference or a receiver front-end. Some possible unintentional sources of frequency offsets may include Doppler offsets or receiver crystal offsets, for example. The existence and magnitude of these offsets is often unknown at the sensing receiver, which makes compensation problematic. However, if these large frequency offsets are not compensated for in the sensing receiver, the performance of the correlation detector can be very unreliable, especially at low signal-to-noise (SNR) ratios. In addition, unknown received pilot-level and timing offset can reduce the performance of the correlation detector.

According to the embodiments of the present invention, secondary users of cognitive or software radios quickly and robustly determine the presence of an incumbent signal. It is understood that incumbent users are endowed with pre-emptive access to the spectrum, whereas secondary users (e.g., cognitive radio users and software radio users) only have access rights for opportunistic usage in the spectrum white spaces on a non-interfering basis with the incumbent users. White spaces are well-known in the communication arts and defined as allocated but virtually unused portions of a wireless spectrum. According to the embodiments of the present invention, the secondary users quickly and robustly detect the presence of an incumbent user and rapidly relinquish the spectrum to the incumbent user to preclude any potential harmful interference and enable spectrum sharing.

According to one embodiment of the invention, to quickly and robustly detect the presence of an incumbent user and rapidly relinquish the spectrum to the incumbent user when necessary, carrier recovery is performed in a receiver of the secondary user's cognitive or software radio prior to performing correlation to correct for large frequency offsets and improve the performance of the correlation detector.

The invention is broadly applicable for use with any incumbent signal that includes at least one known PN sequence. Further, the invention is applicable to any incumbent signal that may be transmitted at an IF or RF frequency that is sampled at a sensor at any sampling rate. According to the embodiments of the present invention, carrier recovery is performed prior to correlation detection with an oversampled reference signal, including, for example, a segment sync, a 511 PN sequence length, a 63 PN sequence or combinations thereof.

Various embodiments of the present invention are illustrated in the figures of the accompanying drawings which are meant to be exemplary and not limiting, in which like reference characters are intended to refer to like or corresponding parts, and in which.

The present invention is now described in more detail in terms of an exemplary system, method and apparatus for providing a robust and efficient solution for recovering a carrier signal at a low signal-to-noise ratio by performing carrier recovery prior to performing correlation to correct for large frequency offsets and thereby improve the performance of the correlation detector.

Spectrum sensing is a mandatory function in any CR based wireless system that shares spectrum bands with primary services, such as the IEEE 802.22 standard. More particularly, spectrum sensing is the key enabler for dynamic spectrum access as it can allow secondary networks to reuse spectrum without causing harmful interference to primary users. Accordingly, the invention can be characterized as a spectrum sensing technique based on FFT-based pilot detection.

The spectrum sensing described herein is particularly, but not exclusively, designed for operation in highly dynamic and dense networks and have been adopted in the current draft of the IEEE 802.22 standard. The spectrum sensing described herein is designed to primarily protect two types of incumbents, namely, the TV service and wireless microphones. In particular, wireless microphones are licensed secondary users of the spectrum, and are allowed by the FCC to operate on vacant TV channels on a non-interfering basis.

Figure 1:
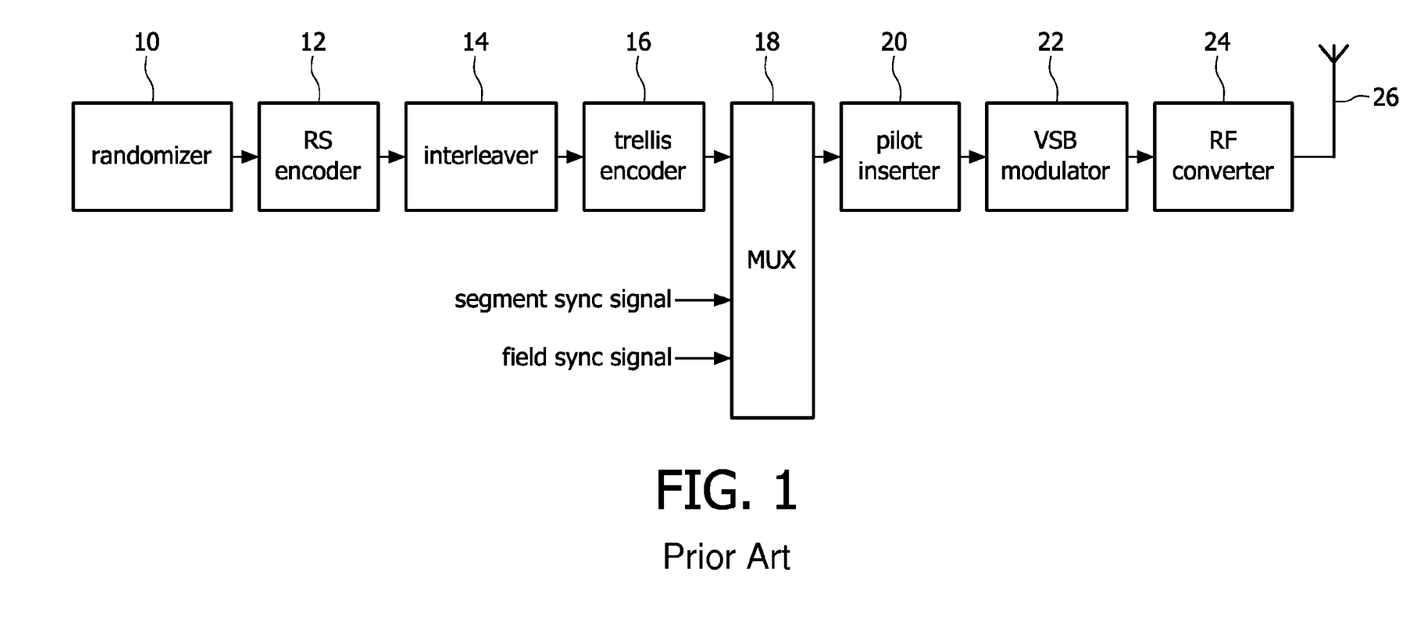
FIG. 1 illustrates a block diagram of a conventional ATSC 8-VSB transmitter.

FIG. 1 illustrates a block diagram of a conventional digital broadcasting transmission apparatus, which is used for regularly inserting and transmitting known data. It is a standard 8-level vestigial sideband (VSB) transmission apparatus and includes a randomizer 10, a Reed-Solomon (RS) encoder 12, an interleaver 14, a trellis encoder 16, a multiplexer (MUX) 18, a pilot inserter 20, a VSB modulator 22, and a radio frequency (RF) transformer 24.

The pilot inserter 20 inserts pilot signals into the symbol stream from the multiplexer 18. The pilot signal is inserted after the randomization and error coding stages so as not to destroy the fixed time and amplitude relationships that these signals possess to be effective. Before the data is modulated, a small DC shift is applied to the 8-VSB baseband signal. This causes a small residual carrier to appear at the zero frequency point of the resulting modulated spectrum. This is the pilot signal provided by the pilot inserter 20. This gives RF phase-lock-loop (PLL) circuits in a VSB receiver something to lock onto that is independent of the data being transmitted. After the pilot signal is inserted by the pilot inserter 20, the output is subjected to a VSB modulator 22. The VSB modulator 22 modulates the symbol stream into an 8 VSB signal of an intermediate frequency band. The VSB modulator 22 provides a filtered (root-raised cosine) IF signal at a standard frequency (44 MHz in the U.S.), with most of one sideband removed.

In particular, the eight level baseband signal is amplitude modulated onto an intermediate frequency (IF) carrier. The modulation produces a double sideband IF spectrum about the carrier frequency. However, the total spectrum is too wide to be transmitted in the assigned 6 MHz channel. The sidelobes produced by the modulation are simply scaled copies of the center spectrum, and the entire lower sideband is a mirror image of the upper sideband. Therefore using a filter, the VSB modulator discards the entire lower sideband and all of the sidelobes in the upper sideband. The remaining signal—upper half of the center spectrum—is further eliminated in one-half by using the Nyquist filter. The Nyquist filter is based on the Nyquist Theory, which summarizes that only a ½ frequency bandwidth is required to transmit a digital signal at a given sampling rate.

Further according to FIG. 1, RF (Radio Frequency) converter 24 converts the signal of an intermediate frequency band from the VSB modulator 22 into a signal of a RF band signal, and transmits the signal to a reception system through an antenna 26.

Figure 2:
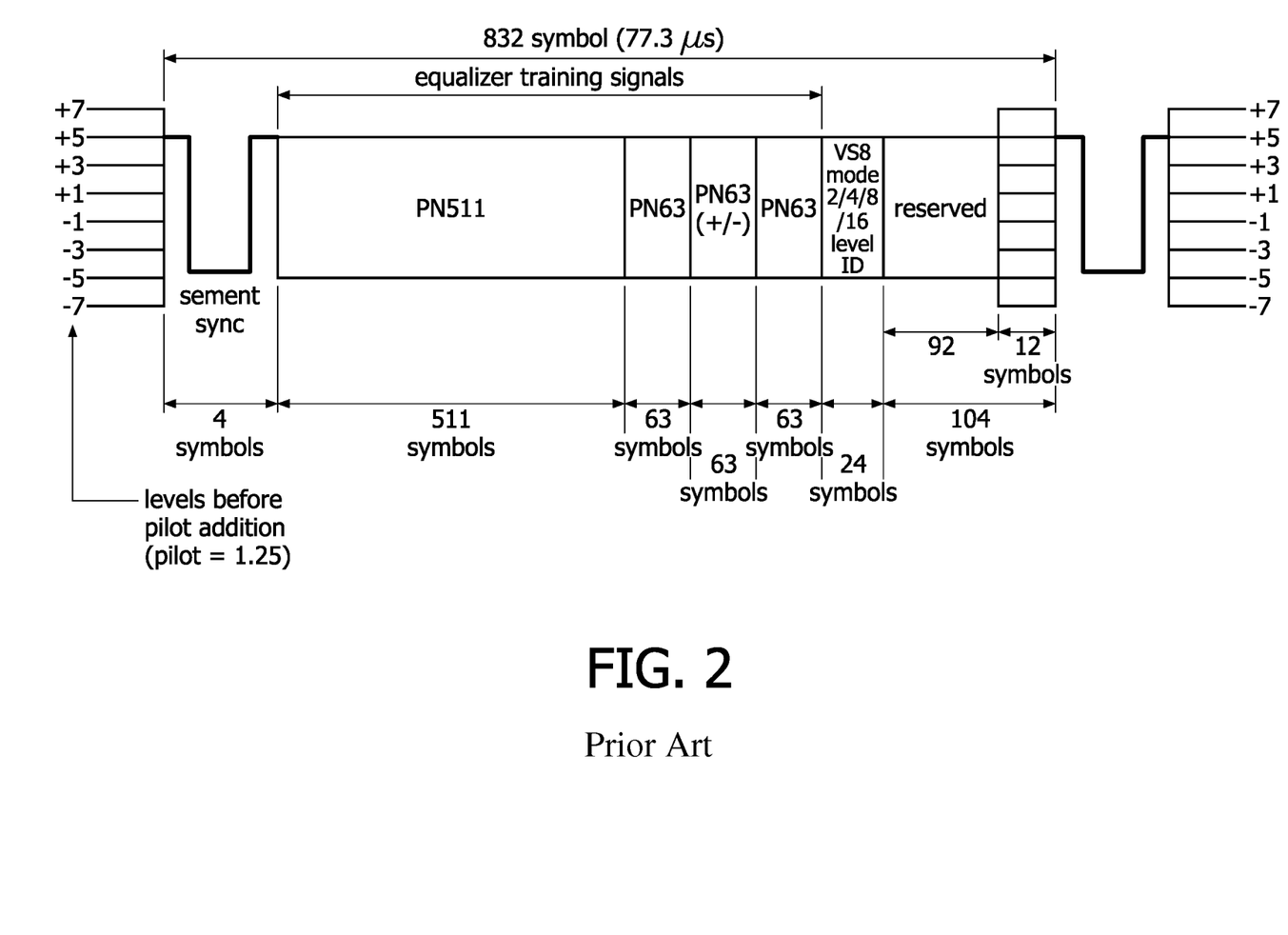
FIG. 2 is a diagram illustrating the structure of a field synchronization signal of the VSB signal of FIG. 1.

Each data frame of the 8-VSB signal has two fields, i.e., an odd field and an even field. Each of the two fields has 313 segments, with a first segment corresponding to a field synchronization (sync) signal. FIG. 2 is a diagram illustrating the structure of a field synchronization signal of the 8-VSB signal of FIG. 1. As illustrated in FIG. 2, each of the segments of the odd and even fields has 832 symbols. The first four symbols of each of the segments in each of the odd and even fields contain a segment synchronization signal (4-symbol data-segment-synchronization (DSS)) sequence.

In order to make the VSB signal more receivable, training sequences are embedded into the first segment (containing the field sync signal) of each of the odd and even fields of the VSB signal. The field synchronization signal includes four pseudo-random training sequences for a channel equalizer: a pseudo-random number (PN) 511 sequence, comprised of 511 symbols; and three PN63 sequences, each of which is comprised of 63 symbols. The sign of the second PN63 sequence of the three PN63 sequences changes whenever a field changes, thereby indicating whether a field is the first (odd) or second (even) field of the data frame. A synchronization signal detection circuit determines the profile of the amplitudes and positions (phase) of received multi-path signals, using the PN511 sequence, and generates a plurality of synchronization signals necessary for various DTV reception operations, such as a decoding operation.

Figure 3:
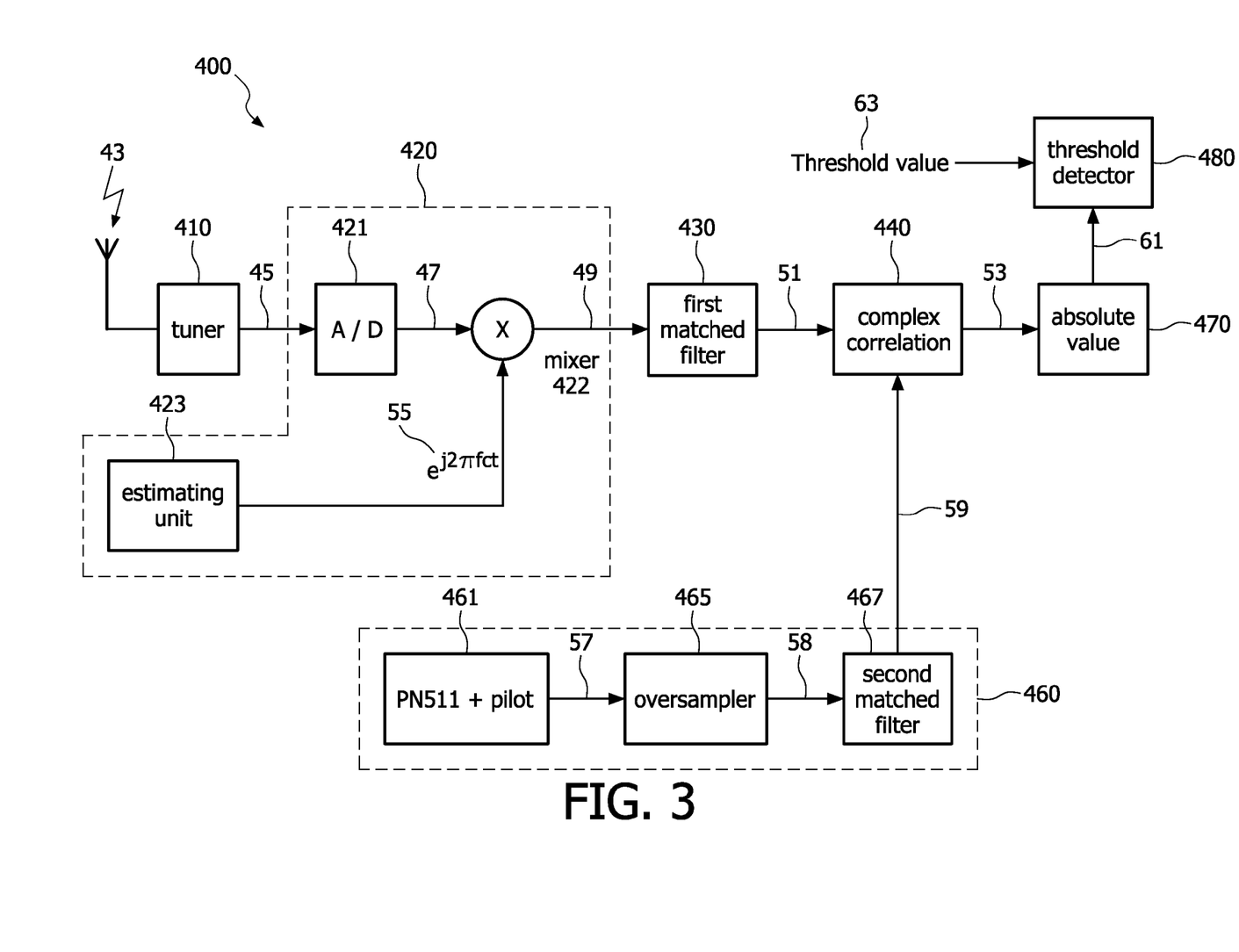
FIG. 3 illustrates a block diagram showing a detector in accordance with one embodiment of the invention.

FIG. 3 is a block diagram of a sensing unit 400 with an FFT-based estimating unit 423, according to an exemplary embodiment of the present invention. As shown in the figure, the sensing unit 400 includes a tuner 410, a demodulator 420, a first matched filter 430, a complex correlation unit 440, a local reference signal generating unit 460, an absolute value determination unit 470 and a threshold detector 480.

The demodulator 420 includes an analog-to-digital (A/D) converter 421, a complex mixer 422, and an FFT-based estimating unit 423.

The local reference signal generating unit 460 includes a PN511 and pilot generating unit 461, an oversampling unit 465, and a second matched filter 467.

In operation, the tuner 410 receives a high frequency signal 43, transmitted through the air via an antenna, and tunes the received high frequency signal to a low IF signal 45. The A/D converter 421 converts the low IF (LIF) signal 45 into a digital LIF signal 47, which is supplied as one input to the complex mixer 422. In the complex mixer 422 the digital LIF signal is combined with a reference signal 55, output from the FFT-based estimating unit 423. The FFT-based estimating unit 423 outputs an estimate of the characteristic frequency $f_c$. A process for estimating the carrier frequency $f_c$, in the FFT-based estimating unit 423 according to an embodiment of the present invention is described in detail below with respect to the flowchart of FIG. 5. The output of the complex mixer 422 is a complex demodulated base-band signal 49, which is supplied to the first matched filter 430 for performing a matched filtering (MF) operation to produce complex signal 51. Complex signal 51 is supplied as one input to the complex correlation unit 440, which performs a complex correlation with the oversampled local reference signal 59 output from the second matched filter 467. The second matched filter 467 receives the local reference signal 58 from the oversampling unit 465. The local reference signal 57 is generated in the PN511+Pilot unit 461 and supplied to the oversampling unit 465.

Complex correlation unit 440 outputs a complex correlation signal 53, which is supplied as input to the absolute value unit 470. The absolute value unit 470 outputs an absolute value complex correlation signal 61 as one input to the threshold detector 480. The absolute value complex correlation signal 61 is compared with a threshold value 63 supplied as a second input to the threshold detector 480 to determine the presence or absence of a signal of an incumbent user.

It should be understood that the choice of a threshold value 63 is determined by a desired probability of false alarm, $P_{FA}$.

Figure 4:
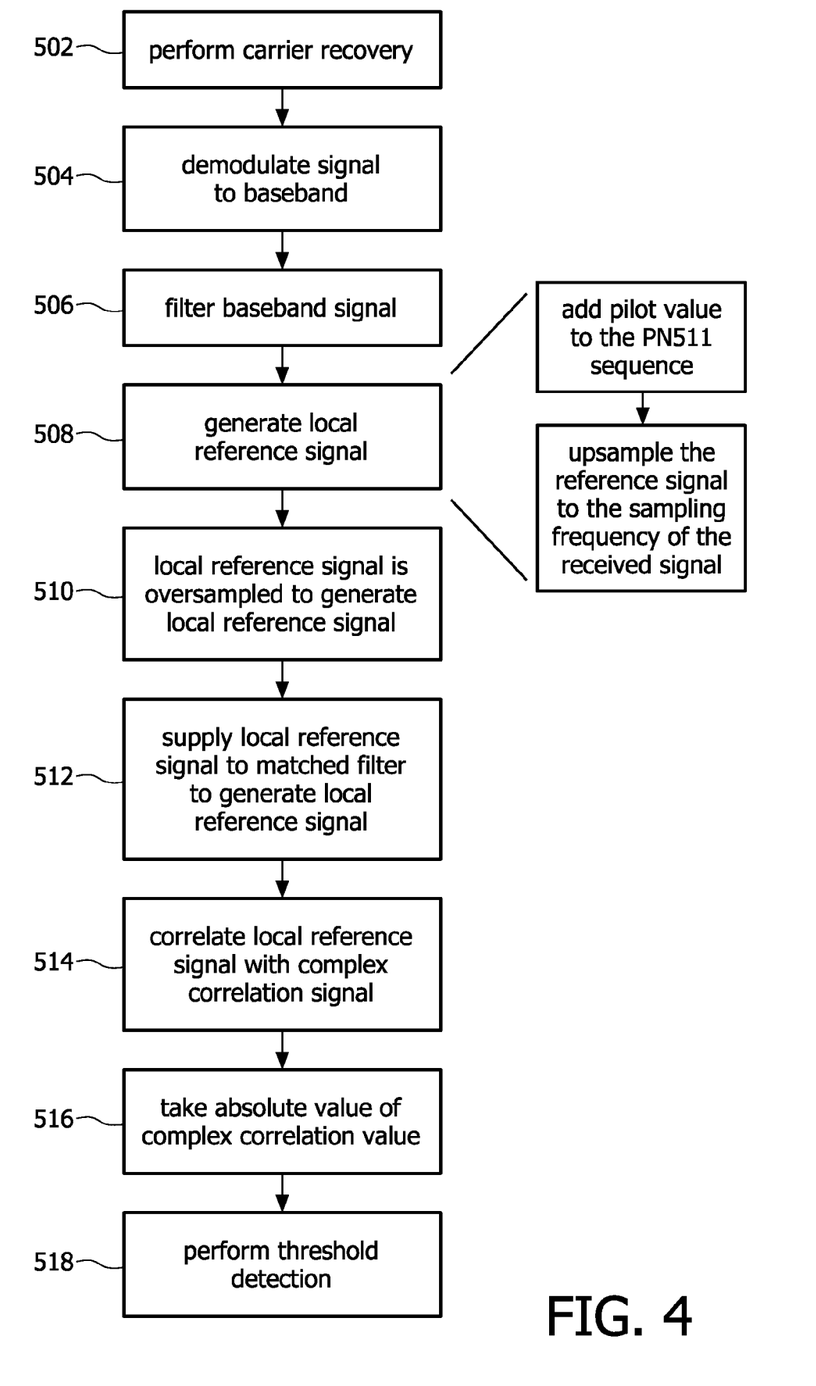
FIG. 4 is a flow diagram illustrating a process for performing carrier recovery.

Referring now to FIG. 4, a flowchart is provided for illustrating a method for quickly and robustly detecting the presence of a signal of an incumbent user. In accordance with the described method, carrier recovery is performed prior to correlation to correct for large frequency offsets and thereby improve the performance of the correlation detector. The steps to be described as follows, amongst other advantages, can adequately compensate for large frequency offsets, thus making the performance of the correlation detector very reliable, especially at low signal-to-noise ratios. Further, unknown received pilot-level and timing offsets are reduced to further enhance the performance of the correlation detector.

The method described in accordance with FIG. 4 is provided in the context of the sensing unit 400 of FIG. 3. It is understood that the method may be performed in software or firmware by a processing unit such as a microprocessor, DSP, or the like.

At block 502, the carrier frequency $f_c$ of received signal, x(t), received via antenna, is estimated. This is described in greater detail below with reference to the flowchart of FIG. 5. At block 504, the received signal x(t) is demodulated to the baseband signal, i.e., $y(t)=x(t)e^{-j2\pi f_c t}$, using the estimated carrier frequency $f_c$. At block 506, the baseband signal, i.e., $y(t)=x(t)e^{-j2\pi f_c t}$, is filtered with an SQRC filter of bandwidth 5.38 MHz in a matched filter, where the filter bandwidth is substantially +/−11.5% of the center frequency to generate a filtered baseband signal. At block 508, a local reference signal is generated. This is achieved by adding a pilot value to the PN511 sequence and upsampling the reference signal to the sampling frequency of the received signal. At block 510, the local reference signal is oversampled to generate an oversampled local reference signal. At block 512, the oversampled local reference signal is supplied as an input to the second matched filter to generate a filtered local reference signal. At block 514, the filtered local reference signal is correlated with complex correlation signal. At block 516, the absolute complex correlation value is supplied. At block 518, the absolute complex correlation value is compared with the threshold detection value 63 to determine the presence of a received (incumbent) signal.

Figure 5:
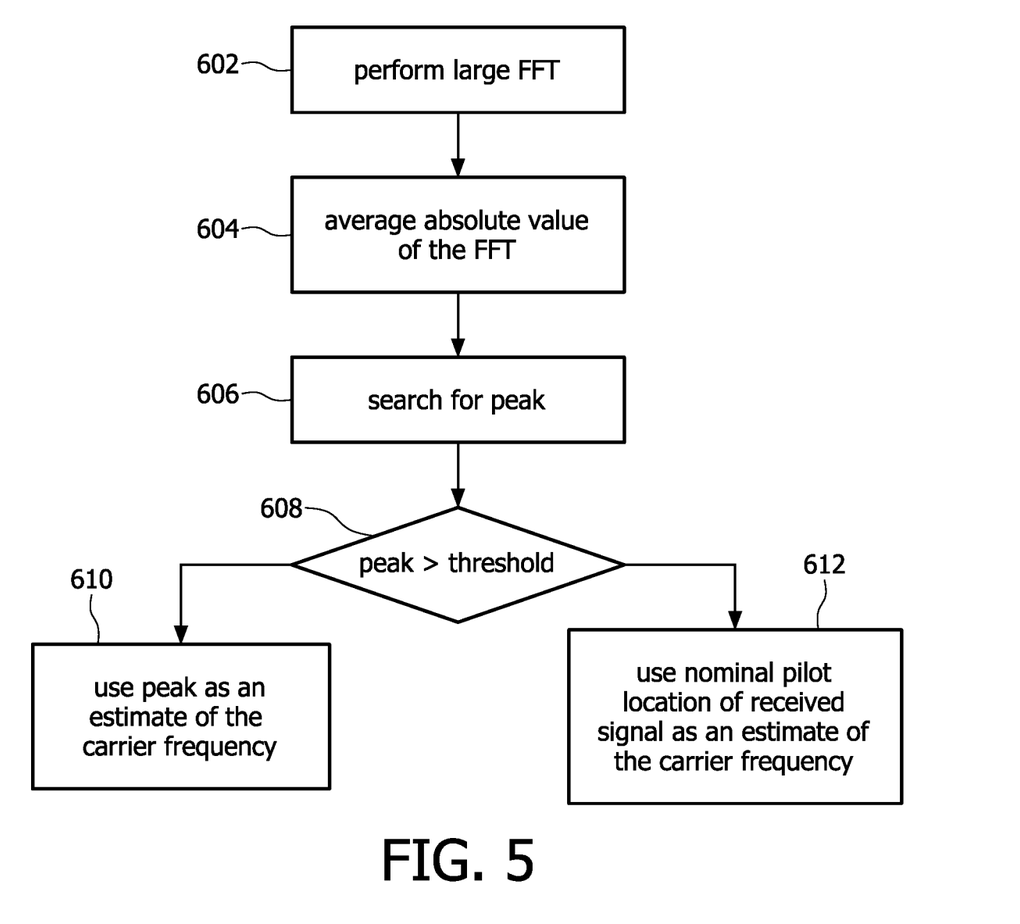
FIG. 5 is a detailed flow diagram further describing carrier recovery of the flow diagram of FIG. 4.

Referring now to FIG. 5, a flowchart illustrates more details of block 502 of FIG. 4. As stated above, block 502 is directed to estimating the carrier frequency $f_c$ of the received signal x(t). At block 602, an FFT transformation is performed on a section of the LIF signal x(t). At block 604, the absolute value of the FFT output is averaged over a number of adjacent data sections yielding a single averaged FFT output. At block 606, the peak of the averaged FFT output is identified. At block 608, the identified peak value is compared to a threshold to determine which is greater. If the peak is determined to be greater than the threshold, the process continues at block 610. Otherwise, the process continues at block 612. At block 610, the identified peak position is used as an estimate of the carrier frequency to demodulate the received signal x(t). At block 612, the nominal pilot location of the received signal is used as an estimate of the carrier frequency to demodulate the received signal x(t).

Like the digital ATSC standard, the analog National Television System Committee (NTSC) broadcast signals also contain a pilot signal and other known synchronization signal components that can be used for the receiver's position location. The present invention applies to the analog NTSC broadcast signals. For example the horizontal scan synchronization signal occurs in each horizontal scan time of 63.6 microseconds. This 63.6 microsecond is equivalent to the segment time interval discussed earlier while this horizontal scan synchronization signal plays a similar role to the segment synchronization bit waveform of the digital ATSC standard. For these analog TV broadcast signals there is also a known Ghost Canceling Reference (GCR) signal that occurs periodically, which is used by the TV receivers to combat multipath during signal propagation from the transmitter to the receivers. This GCR signal is analogous to the Field Synchronization Segment signal of the digital ATSC broadcast signal. The present invention also extends to other types of analog TV broadcast signals.

The European Telecommunications Standards Institute (ETSI) established the Digital Video Broadcasting-Terrestrial (DVB-T) standard, which is based on the use of Orthogonal Frequency Division Multiplexing (OFDM) signals. The present invention is applicable to DVB-T and the closely related Japanese Integrated Services Digital Broadcasting-Terrestrial (ISDB-T) system. The 8K mode of the DVB-T system, for example, consists of 6,816 OFDM carriers where each carrier is QAM modulated (QPSK is a special case) with a coded data symbol of 896 microsecond duration. The entire set of 6,816 data symbols is referred to as one symbol of this DVB-T broadcast signal. The individual QAM modulated symbols with carriers of 896 microsecond duration are sometimes called cells. Many of these cells are fixed and used for the purpose of synchronization at the TV receivers. These known synchronization cells, called pilot carriers or cells, can be used to determine the receiver's position location based on the present invention.

The present invention is applicable to other OFDM broadcast signals, such as the ETSI Digital Audio Broadcast (DAB) and the United States In-Band On-Channel (IBOC) digital audio broadcast systems. OFDM audio broadcast signals are also used by the terrestrial relays of the Satellite Digital Audio Radio Service (SDARS) systems of Sirius and XMRadio.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method for detecting a received signal, comprising:
    adding a pilot value to a reference signal;
    upsampling the reference signal to a sampling frequency of the received signal;
    correlating the upsampled reference signal with a demodulated baseband signal to produce a correlation value; and
    determining that the received signal is present if the correlation value is greater than a predetermined detection threshold value.

2. A method for detecting the presence of a received signal in a sensor, comprising:
    estimating a carrier frequency of the received signal;
    using the estimated carrier frequency to demodulate the received signal to generate a complex demodulated baseband signal;
    low-pass filtering the complex demodulated baseband signal;
    generating an over-sampled local reference signal having the same sampling rate as the received signal;
    correlating the over-sampled local reference signal with the low-pass filtered complex demodulated baseband signal yielding a complex correlation value;
    taking the absolute value of the complex correlation value;
    comparing the absolute value of the complex correlation value to a detection threshold; and
    determining that the received signal is present if the absolute value of the complex correlation value is greater than the detection threshold.

3. The method according to claim 2, wherein the estimating further comprises:
    performing a frequency domain transformation on N sections of the received signal yielding a plurality of N independent vectors;
    taking the absolute value of each of the plurality of N independent vectors;
    averaging the absolute value of each of the N independent vectors yielding a single averaged independent vector;
    identifying a peak of the single averaged independent vector;
    comparing the identified peak of the single averaged independent vector with a threshold; and
    using the identified peak position of the single averaged independent vector as an estimate of the carrier frequency if the identified peak is greater than the threshold, and otherwise using a nominal pilot location of the received signal as an estimate of the carrier frequency.

4. The method according to claim 3 wherein the frequency domain transformation is an FFT transformation.

5. The method according to claim 4 wherein the FFT transformation is performed in a single dwell.

6. The method according to claim 4 wherein the FFT transformation is performed in a plurality of dwells.

7. The method according to claim 3 wherein the frequency domain transformation is a power spectral density transformation.

8. The method according to claim 2, wherein the received signal includes at least one pilot in a known location.

9. The method according to claim 8, wherein the low-pass filtering comprises filtering the complex demodulated baseband signal in a region around said pilot in said known location of the received signal.

10. The method according to claim 2, wherein the received signal is one of a radio frequency signal and an intermediate frequency signal.

11. A sensor for detecting the presence of a received signal in a wireless system, comprising:
 a tuner for receiving one of a radio frequency signal to produce a low IF (LIF) signal;
 a demodulating unit for demodulating the low IF signal to produce a complex demodulated baseband signal;
 a first matched filter for performing a matched filtering operation on the first complex signal to produce a second complex signal;
 a local reference signal generating unit for generating an oversampled local reference signal;
 a complex correlation unit for performing a complex correlation between the oversampled local reference signal and the second complex signal to produce a third complex signal;
 an absolute value unit for taking the absolute value of the third complex signal to produce a fourth complex signal; and
 a threshold detector for comparing the fourth complex signal with a threshold value to determine if the received signal is present.

12. The sensor according to claim 11, wherein the local reference signal generating unit further comprises:
 a PN511 and pilot generating unit for generating local reference sequence;
 an oversampling unit for receiving local reference sequence and generating local reference sequence; and
 a second matched filter for receiving the intermediate local reference sequence and generating local reference signal.

13. The sensor according to claim 11, wherein the sensor is one of a software radio and a cognitive radio.

* * * * *